United States Patent
Fukaya et al.

(10) Patent No.: US 9,206,325 B2
(45) Date of Patent: Dec. 8, 2015

(54) WATER-BASED INK FOR INK-JET RECORDING, WATER-BASED INK SET FOR INK-JET RECORDING, AND TREATMENT AGENT

(71) Applicant: Brother Kogyo Kabushiki Kaisha, Nagoya-shi, Aichi-ken (JP)

(72) Inventors: Hideji Fukaya, Nisshin (JP); Yasuhiro Taga, Kani (JP); Mitsunori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/657,607

(22) Filed: Mar. 13, 2015

(65) Prior Publication Data
US 2015/0259551 A1 Sep. 17, 2015

(30) Foreign Application Priority Data

Mar. 15, 2014 (JP) .................................. 2014-052849
Sep. 29, 2014 (JP) .................................. 2014-199315

(51) Int. Cl.

| C09D 11/02 | (2014.01) |
|---|---|
| C09D 11/322 | (2014.01) |
| C09D 11/326 | (2014.01) |
| C08K 3/04 | (2006.01) |
| C08K 5/23 | (2006.01) |
| C08K 5/3417 | (2006.01) |
| C08K 5/3437 | (2006.01) |

(52) U.S. Cl.
CPC .............. *C09D 11/322* (2013.01); *C08K 3/04* (2013.01); *C08K 5/23* (2013.01); *C08K 5/3417* (2013.01); *C08K 5/3437* (2013.01); *C09D 11/326* (2013.01); *C08K 2003/045* (2013.01)

(58) Field of Classification Search
CPC ............................ C09D 11/322; C09D 11/326
See application file for complete search history.

(56) References Cited

U.S. PATENT DOCUMENTS

| 5,554,739 A | 9/1996 | Belmont |
|---|---|---|
| 5,571,311 A | 11/1996 | Belmont et al. |
| 5,609,671 A | 3/1997 | Nagasawa |
| 5,630,868 A | 5/1997 | Belmont et al. |
| 5,672,198 A | 9/1997 | Belmont |
| 5,713,988 A | 2/1998 | Belmont et al. |
| 5,837,045 A | 11/1998 | Johnson et al. |
| 5,851,280 A | 12/1998 | Belmont et al. |
| 5,900,029 A | 5/1999 | Belmont et al. |
| 5,985,016 A | 11/1999 | Tsang et al. |
| 6,042,643 A | 3/2000 | Belmont et al. |

(Continued)

FOREIGN PATENT DOCUMENTS

| JP | H083498 A | 1/1996 |
|---|---|---|
| JP | H11193361 A | 7/1999 |

(Continued)

OTHER PUBLICATIONS

Sep. 15, 2015—(US) Non-Final Office Action—U.S. Appl. No. 14/661,239.

(Continued)

*Primary Examiner* — Veronica F Faison
(74) *Attorney, Agent, or Firm* — Banner & Witcoff, Ltd.

(57) ABSTRACT

A water-based ink for ink-jet recording includes a self-dispersible pigment which is modified with phosphate group, pullulan or a derivative thereof, and water.

20 Claims, 3 Drawing Sheets

(56) References Cited

U.S. PATENT DOCUMENTS

| | | |
|---|---|---|
| 6,150,433 A | 11/2000 | Tsang et al. |
| 6,494,946 B1 | 12/2002 | Belmont et al. |
| 7,553,883 B2 | 6/2009 | Yatake |
| 7,819,962 B2 | 10/2010 | Gu |
| 8,016,404 B2 | 9/2011 | Kato et al. |
| 8,727,523 B2 | 5/2014 | Tamai et al. |
| 8,858,695 B2 | 10/2014 | Gu et al. |
| 2003/0095914 A1 | 5/2003 | Belmont et al. |
| 2004/0241348 A1 | 12/2004 | Koga et al. |
| 2005/0034629 A1 | 2/2005 | Belmont et al. |
| 2006/0058420 A1 | 3/2006 | Yatake |
| 2007/0100023 A1 | 5/2007 | Burns et al. |
| 2007/0100024 A1 | 5/2007 | Gu et al. |
| 2008/0118657 A1 | 5/2008 | Taverizatshy et al. |
| 2008/0241398 A1 | 10/2008 | Kato et al. |
| 2009/0229489 A1 | 9/2009 | Gu |
| 2011/0011307 A1 | 1/2011 | Shakhnovich et al. |
| 2011/0249058 A1 | 10/2011 | Shibata et al. |
| 2012/0236066 A1 | 9/2012 | Tamai et al. |
| 2013/0224451 A1 | 8/2013 | Shiono et al. |

FOREIGN PATENT DOCUMENTS

| | | |
|---|---|---|
| JP | H11222573 A | 8/1999 |
| JP | 2000-513396 A | 10/2000 |
| JP | 2000-313830 A | 11/2000 |
| JP | 2001-115069 A | 4/2001 |
| JP | 2006-002141 A | 1/2006 |
| JP | 2006-159422 A | 6/2006 |
| JP | 2006-199968 A | 8/2006 |
| JP | 2007-246656 A | 9/2007 |
| JP | 2008-246821 A | 10/2008 |
| JP | 2009-513802 A | 4/2009 |
| JP | 2009-515007 A | 4/2009 |
| JP | 2011-510155 A | 3/2011 |
| JP | 2011-515535 A | 5/2011 |
| JP | 2012-087309 A | 5/2012 |
| JP | 2012-207210 A | 10/2012 |
| JP | 2013-181055 A | 9/2013 |
| WO | 9748769 A1 | 12/1997 |
| WO | 2007053563 A2 | 5/2007 |
| WO | 2009094178 A2 | 7/2009 |

OTHER PUBLICATIONS

Mar. 13, 2015—Co-pending U.S. Appl. No. 14/657,674.
Mar. 18, 2015—Co-pending U.S. Appl. No. 14/661,239.
Oct. 13, 2015—(US) Non-Final office Action—U.S. Appl. No. 14/657,674.

WATER-BASED INK FOR INK-JET RECORDING, WATER-BASED INK SET FOR INK-JET RECORDING, AND TREATMENT AGENT

CROSS REFERENCE TO RELATED APPLICATION

The present application claims priority from Japanese Patent Application Nos. 2014-052849 filed on Mar. 15, 2014 and 2014-199315 filed on Sep. 29, 2014, the disclosure of which is incorporated herein by reference in its entirety.

BACKGROUND OF THE INVENTION

1. Field of the Invention

The present invention relates to a water-based ink for ink-jet recording, a water-based ink set for ink-jet recording, and a treatment agent.

2. Description of the Related Art

In order to improve the optical density (OD value) and the chromaticness, it has been suggested that a water-dispersible polymer is contained in a water-based pigment ink (for example, Japanese Patent Application Laid-open No. 2006-2141 corresponding to United States Patent Application Publication No. 2006/0058420 and Japanese Patent Application Laid-open No. 2012-87309 corresponding to United States Patent Application Publication No. 2006/0058420).

However, it is demanded for the water-based pigment ink to further improve the optical density (OD value).

On the other hand, a water-based ink set for ink-jet recording has been suggested, wherein a treatment agent, which unstabilizes a dissolved state or a dispersed state of a colorant contained in a water-based ink for ink-jet recording, is combined with the water-based ink for ink-jet recording in order to improve the optical density (OD value) (for example, Japanese Patent Application Laid-open No. 2006-159422).

However, it is demanded for the water-based ink set to further improve the optical density (OD value). Furthermore, it is also demanded for the water-based ink set to improve the chromaticness in the color recording.

SUMMARY OF THE INVENTION

In view of the above, an object of the present teaching is to provide a water-based ink for ink-jet recording based on the use of a self-dispersible pigment which makes it possible to further improve the optical density (OD value) and the chromaticness. Furthermore, an object of the present teaching is to provide a water-based ink set for ink-jet recording which makes it possible to further improve the optical density (OD value) and the chromaticness.

According to a first aspect of the present teaching, there is provided a water-based ink for ink-jet recording, including a self-dispersible pigment modified with phosphate group; pullulan or a derivative thereof; and water.

According to a second aspect of the present teaching, there is provided a water-based ink set for ink-jet recording, including a water-based ink for ink-jet recording which contains a self-dispersible pigment and water; and a treatment agent which contains pullulan or a derivative thereof.

According to a third aspect of the present teaching, there is provided a treatment agent which is to be used for the water-based ink set for ink-jet recording as defined in the second aspect.

DESCRIPTION OF THE PREFERRED EMBODIMENTS

First Embodiment

In this embodiment, the water-based ink for ink-jet recording (hereinafter referred to as "water-based ink" or "ink" in some cases) will be explained. The water-based ink of this embodiment is exemplified by the water-based black-based ink for ink-jet recording (hereinafter referred to as "water-based black-based ink" or "black-based ink" in some cases) and the water-based chromatic color ink (water-based color ink) for ink-jet recording (hereinafter referred to as "water-based chromatic color ink" or "chromatic color ink" in some cases). The "water-based ink" or the "ink", which is simply referred to in the specification of this application in some cases, means both of the black-based ink and the chromatic color ink.

In this embodiment, the term "black-based" refers to the achromatic color except for the white, and the term includes the black and the gray. Furthermore, the term "chromatic color" means the color other than the achromatic colors of white, black, and gray.

In this embodiment, the phrase "at least one of pullulan and a derivative thereof" means that it is also allowable to use pullulan singly, it is also allowable to use the pullulan derivative singly, or it is also allowable to use a mixture of pullulan and the pullulan derivative.

The water-based ink for ink-jet recording of this embodiment will be explained. The water-based ink of this embodiment contains a colorant, water, and a water-soluble macromolecule. As described above, the colorant includes the self-dispersible pigment modified with phosphate group (hereinafter referred to as "phosphate group-modified self-dispersible pigment" in some cases). The phosphate group-modified self-dispersible pigment is exemplified by the self-dispersible black-based pigment modified with phosphate group (hereinafter referred to as "phosphate group-modified self-dispersible black-based pigment" in some cases) and the self-dispersible chromatic color pigment modified with phosphate group (hereinafter referred to as "phosphate group-modified self-dispersible chromatic color pigment" in some cases). The "phosphate group-modified self-dispersible pigment", which is simply referred to in the specification of the present application in some cases, means both of the phosphate group-modified self-dispersible black-based pigment and the phosphate group-modified self-dispersible chromatic color pigment.

The phosphate group-modified self-dispersible pigment can be prepared in accordance with a method described, for example, in Japanese Patent Application Laid-open No. 2009-515007 (PCT) corresponding to United States Patent Application Publication Nos. 2007/0100023 and 2007/0100024; Japanese Patent Application Laid-open No. 2011-515535 (PCT) corresponding to United States Patent Application Publication No. 2009/0229489; Japanese Patent Application Laid-open No. 2006-199968 corresponding to U.S. Pat. No. 5,554,739, U.S. Pat. No. 5,571,311, U.S. Pat. No. 5,630,868, U.S. Pat. No. 5,672,198, U.S. Pat. No. 5,713,988, U.S. Pat. No. 5,851,280, U.S. Pat. No. 5,900,029, U.S. Pat. No. 6,042,643, U.S. Pat. No. 6,494,946, United States Patent Application Publication No. 2003/0095914, and United States Patent Application Publication No. 2005/0034629; Japanese Patent Application Laid-open No. 2009-513802 (PCT) corresponding to United States Patent Application Publication Nos. 2007/0100023 and 2007/0100024; and Japanese Patent Application Laid-open No. 2011-510155 (PCT) corresponding to United States Patent Application Publication No. 2011/0011307. For example, any commercially available product may be used for the phosphate group-modified self-dispersible pigment. The water-based ink of this embodiment uses the self-dispersible pigment. Therefore, no problem arises in relation to the increase in the viscosity which would be otherwise caused by the macromolecular pigment dispersing agent, and the water-based ink of this embodiment is excellent in the handling performance.

The black-based pigment, which can be used as the raw material for the self-dispersible black-based pigment, is exemplified, for example, by carbon black, inorganic pigment, and organic pigment. The carbon black is exemplified, for example, by furnace black, lamp black, acetylene black, and channel black. The inorganic pigment can be exemplified, for example, by carbon black-based inorganic pigment. The organic pigment is exemplified, for example, by aniline black daylight fluorescent pigment. Pigments other than the above are also exemplified, for example, by C. I. Pigment Blacks 1, 6. In particular, the pigment, which is appropriate to perform the modification with the phosphate group, is exemplified, for example, by carbon blacks such as "MA8" and "MA100" produced by Mitsubishi Chemical Corporation and "Color Black FW200" produced by Degussa.

The pigment, which can be used as the raw material for the self-dispersible chromatic color pigment, is exemplified, for example, by organic pigments. The organic pigment is exemplified, for example, by azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; and aniline black daylight fluorescent pigment. Pigments other than the above are also exemplified, for example, by C. I. Pigment Yellows 1, 2, 3, 12, 13, 14, 15, 16, 17, 55, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; and C. I. Pigment Greens 7 and 36.

The phosphate group-modified self-dispersible pigment is preferably the black-based pigment modified with phosphate group, and more preferably carbon black modified with phosphate group. Accordingly, it is possible to obtain the water-based ink in which the optical density is further improved.

The solid content blending amount of the phosphate group-modified self-dispersible pigment (pigment solid content amount) with respect to the total amount of the water-based ink is not specifically limited, which can be appropriately determined, for example, on the basis of the desired optical density or the chromaticness. The pigment solid content amount is, for example, 0.1% by weight to 20% by weight, preferably 1% by weight to 10% by weight, and more preferably 2% by weight to 8% by weight.

The colorant may further include, for example, other pigments and dyes in addition to the phosphate group-modified self-dispersible pigment. However, it is preferable that the colorant is composed of only the phosphate group-modified self-dispersible pigment, and the colorant does not contain any other colorant. When another colorant is used in combination with the phosphate group-modified self-dispersible pigment, the content of the phosphate group-modified self-dispersible pigment with respect to the total amount of the colorant is, for example, 50% by weight to 100% by weight, preferably 80% by weight to 100% by weight, and more preferably 95% by weight to 100% by weight.

It is preferable that the water is ion exchange water or pure water. The blending amount of water (water ratio) with respect to the total amount of the water-based ink is, for example, 10% by weight to 90% by weight, and preferably 40% by weight to 80% by weight. The water ratio may be, for example, the balance of the other components.

As described above, the water-soluble macromolecule includes at least one of pullulan and the derivative thereof (hereinafter referred to as "pullulan or the like" in some cases). Pullulan described above is the compound represented by the formula (1). In the formula (1), n is not specifically limited provided that n is a positive number. For example, n may be determined depending on the molecular weight of pullulan or the like as described later on. The pullulan derivative is exemplified, for example, by carboxymethyl pullulan; phosphorylated pullulan; pullulan ether such as pullulan methyl ether, pullulan ethyl ether, pullulan propyl ether and the like; pullulan ester such as pullulan acetate, pullulan butyrate and the like; silicone modified pullulan; cyanoethylated pullulan; cyanoethylated hydroxyalkyl pullulan such as cyanoethylated hydroxyethyl pullulan, cyanoethylated hydroxypropyl pullulan and the like; and cholesterol pullulan. It is preferable that pullulan or the like is pullulan.

(1)

The water-soluble macromolecule may further include any other water-soluble macromolecule in addition to pullulan or the like. However, it is preferable that the water-soluble macromolecule is composed of only pullulan or the like, and any other water-soluble macromolecule is not contained. When another water-soluble macromolecule is used in combination with pullulan or the like, the blending amount of pullulan or the like with respect to the total amount of the water-soluble macromolecule is, for example, 50% by weight to 100% by weight, preferably 80% by weight to 100% by weight, and more preferably 95% by weight to 100% by weight.

The molecular weight of pullulan or the like is preferably 1,000 to 1,000,000 and more preferably 10,000 to 40,000. When the molecular weight of pullulan or the like is not more than 1,000,000, the increase in viscosity of the ink is not caused, which is preferred.

The blending amount of pullulan or the like with respect to the total amount of the water-based ink (ratio of pullulan or the like) is, for example, 0.5% by weight to 10% by weight, and preferably 0.8% by weight to 5% by weight. When the ratio of pullulan or the like is not less than 0.8% by weight, it is possible to obtain the water-based ink which has the higher optical density (OD value) or the higher chromaticness. Furthermore, when the ratio of pullulan or the like is not more than 5% by weight, it is possible to obtain the water-based ink which is more excellent in the storage stability.

In the water-based ink, the weight ratio between the pigment solid content amount (X) and pullulan or the like (Y) fulfills, for example, X:Y=1:0.07 to 2 (weight ratio (Y/X) of a weight (Y) of pullulan or the like with respect to a weight (X) of the phosphate group-modified self-dispersible pigment: Y/X=0.07 to 2), and preferably X:Y=1:0.11 to 1.25 (weight ratio Y/X=0.11 to 1.25). When X:Y is not less than 1:0.11 (weight ratio Y/X is not less than 0.11), it is possible to obtain the water-based ink which has the higher optical density (OD value) or the higher chromaticness. Furthermore, when X:Y is not more than 1:1.25 (weight ratio Y/X is not more than 1.25), it is possible to obtain the water-based ink which is more excellent in the storage stability.

The mechanism for improving the optical density (OD value) and the chromaticness by using the water-based ink of the present teaching is estimated, for example, as follows. Pullulan or the like described above has the regular structure in which 1,4 bond, 1,4 bond, and 1,6 bond are regularly aligned. It is considered that the regular structure of pullulan or the like as described above causes any interaction with the modification group of the self-dispersible pigment and thus the optical density (OD value) and the chromaticness are improved. On the other hand, for example, starch is a macromolecule composed of D-glucopyranose. However, starch is composed of amylose which has α-1,4 bond and amylopectin which has the amylose skeleton and which has a large number of branched structures of α-1,6 bond. Starch has the structure which is not regular. Therefore, it is considered that the optical density (OD value) and the chromaticness are not improved. However, the mechanism is merely estimated, and the present teaching is not limited thereto.

It is preferable that the water-based ink of this embodiment further contains a water-soluble organic solvent. The water-soluble organic solvent is exemplified, for example, by a humectant (moistening agent) which prevents the water-based ink from being dried at the nozzle forward end portion of the ink-jet head and a penetrant (permeating agent) which adjusts the drying speed on the recording medium.

The humectant described above is not specifically limited. The humectant is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycols; polyhydric alcohols such as alkylene glycols, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. One type of the humectant as described above may be used singly, or two or more types of the humectants as described above may be used in combination. Among them, it is preferable to use polyhydric alcohol such as alkylene glycol and glycerol.

The blending amount of the humectant with respect to the total amount of the water-based ink is, for example, 0% by weight to 95% by weight, preferably 5% by weight to 80% by weight, and more preferably 5% by weight to 50% by weight.

The penetrant is exemplified, for example, by glycol ether. The glycol ether is exemplified, for example, by ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. One type of the penetrant as described above may be used singly, or two or more types of the penetrants as described above may be used in combination.

The blending amount of the penetrant with respect to the total amount of the water-based ink is, for example, 0% by weight to 20% by weight, preferably 0.1% by weight to 15% by weight, and more preferably 0.5% by weight to 10% by weight.

The water-based ink may further contain conventionally known additives, if necessary. The additive includes, for example, surfactants, pH-adjusting agents, viscosity-adjusting agents, surface tension-adjusting agents, and antifungal agents (fungicides). The viscosity-adjusting agent includes, for example, polyvinyl alcohol, cellulose, and water-soluble resin.

The water-based ink described above can be prepared, for example, such that the colorant, water, the water-soluble macromolecule, and optionally other additive components are mixed uniformly or homogeneously in accordance with any conventionally known method, and undissolved matters are removed by means of a filter or the like.

Next, the ink cartridge of this embodiment resides in an ink cartridge including a water-based ink for ink-jet recording, wherein the water-based ink is the water-based ink for ink-jet recording of this embodiment. For example, any conventionally known main body can be used as the main body of the ink cartridge.

Next, the ink-jet recording apparatus and the ink-jet recording method of this embodiment will be explained.

The ink-jet recording apparatus of this embodiment resides in an ink-jet recording apparatus including an ink accommodating unit and an ink discharge mechanism for discharging an ink accommodated in the ink accommodating unit by the ink discharge mechanism, wherein the water-based ink for ink-jet recording of this embodiment is accommodated in the ink accommodating unit.

The ink-jet recording method of this embodiment resides in an ink-jet recording method for performing recording by discharging a water-based ink onto a recording medium in accordance with an ink-jet system, wherein the water-based ink for ink-jet recording of this embodiment is used as the water-based ink.

The ink-jet recording method of this embodiment can be carried out, for example, by using the ink-jet recording apparatus of this embodiment. The recording includes, for example, the letter (character) printing, the image printing, and the printing (print or presswork).

Figure 1:
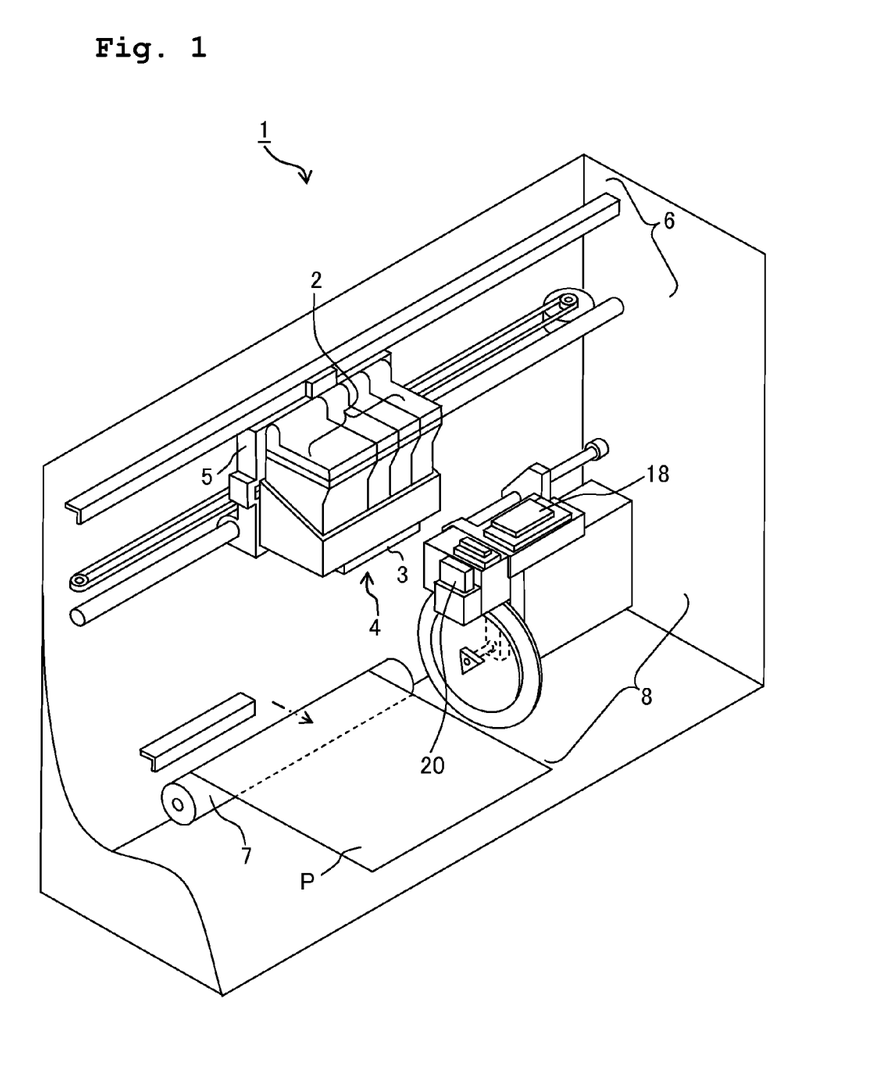
FIG. 1 shows a schematic perspective view illustrating an exemplary arrangement of an ink-jet recording apparatus according to a first embodiment.

FIG. 1 shows an exemplary construction of the ink-jet recording apparatus of this embodiment. The ink-jet recording apparatus of this example is a serial type ink-jet recording apparatus in which a serial type ink-jet head is adopted. As shown in FIG. 1, the ink-jet recording apparatus 1 includes, as main constitutive components, four ink cartridges 2, an ink discharge mechanism (ink-jet head) 3, a head unit 4, a carriage 5, a driving unit 6, a platen roller 7, and a purge apparatus 8.

Each of the four ink cartridges 2 contains one color of each of four colors of water-based inks of yellow, magenta, cyan, and black. For example, at least one of the four color inks is the water-based ink for ink-jet recording of this embodiment. It is also allowable that any general water-based ink is usable for the other water-based inks. The ink-jet head 3, which is installed for the head unit 4, performs the recording on the recording medium (for example, recording paper) P. The four ink cartridges 2 and the head unit 4 are carried on the carriage 5. The driving unit 6 reciprocatively moves the carriage 5 in the straight line direction. For example, those conventionally known can be used as the driving unit 6 (see, for example, Japanese Patent Application Laid-open No. 2008-246821 corresponding to United States Patent Application Publication No. 2008/0241398). The platen roller 7 extends in the reciprocating direction of the carriage 5, and the platen roller 7 is arranged opposingly to the ink-jet head 3.

The purge apparatus 8 sucks any defective ink containing, for example, bubbles accumulated in the ink-jet head 3. For example, those conventionally known can be used as the purge apparatus 8 (see, for example, Japanese Patent Application Laid-open No. 2008-246821 corresponding to United States Patent Application Publication No. 2008/0241398).

A wiper member 20 is arranged adjacently to the purge apparatus 8 on the platen roller 7 side of the purge apparatus 8. The wiper member 20 is formed to have a spatula-shaped form. The wiper member 20 wipes out the nozzle-formed surface of the ink-jet head 3 in accordance with the movement of the carriage 5. With reference to FIG. 1, a cap 18 covers a plurality of nozzles of the ink-jet head 3 which is to be returned to the reset position when the recording is completed, in order to prevent the water-based inks from being dried.

In the ink-jet recording apparatus 1 of this example, the four ink cartridges 2 are carried on one carriage 5 together with the head unit 4. However, this embodiment is not limited thereto. In the ink-jet recording apparatus 1, each of the cartridges of the four ink cartridges 2 may be carried on any carriage distinct from the head unit 4. Alternatively, it is also allowable that the respective cartridges of the four ink cartridges 2 are not carried on the carriage 5, and they are arranged and fixed in the ink-jet recording apparatus 1. In the embodiments as described above, for example, the respective cartridges of the four ink cartridges 2 are connected to the head unit 4 carried on the carriage 5, for example, by tubes or the like, and the water-based inks are supplied from the respective cartridges of the four ink cartridges 2 to the head unit 4.

The ink-jet recording, which is based on the use of the ink-jet recording apparatus 1, is carried out, for example, as follows. At first, the recording paper P is fed from a paper feed cassette (not shown) provided at a side portion or a lower portion of the ink-jet recording apparatus 1. The recording paper P is introduced into the space between the ink-jet head 3 and the platen roller 7. The predetermined recording is performed on the introduced recording paper P by the water-based inks discharged from the ink-jet head 3. The recording paper P after the recording is discharged from the ink-jet recording apparatus 1. The recorded matter, which is recorded by using the water-based ink of this embodiment, has the high optical density (OD value) or the high chromaticness. A paper feed mechanism and a paper discharge mechanism for the recording paper P are omitted from the illustration in FIG. 1.

The apparatus shown in FIG. 1 adopts the serial type ink-jet head. However, this embodiment is not limited thereto. The ink-jet recording apparatus may be an apparatus which adopts a line type ink-jet head.

As explained above, the water-based ink for ink-jet recording of this embodiment makes it possible to further improve the optical density (OD value) and the chromaticness, owing to the fact that the pigment, which is modified with the phosphate group, is used as the self-dispersible pigment, and at least one of pullulan and the derivative thereof is blended.

Second Embodiment

In this embodiment, an explanation will be made about the water-based ink set for ink-jet recording (hereinafter referred to as "water-based ink set" or "ink set" in some cases). The water-based ink set of this embodiment includes a water-based ink for ink-jet recording and a treatment agent. In the first embodiment, the water-based ink contains pullulan or the like. However, in this embodiment, the treatment agent contains pullulan or the like.

At first, the water-based ink of this embodiment will be explained. The water-based ink contains the colorant and water. As described above, the colorant includes the self-dispersible pigment. The self-dispersible pigment is dispersible in water without using any dispersing agent, for example, owing to the fact that at least one of the hydrophilic functional group and the salt thereof including, for example, sulfonic acid group, carboxylic acid group, and phosphoric acid group is introduced into the pigment particles by the chemical bond directly or with any other group intervening therebetween. The water-based ink of this embodiment uses the self-dispersible pigment. Therefore, no problem arises in relation to the increase in the viscosity which would be otherwise caused by the macromolecular pigment dispersing agent, and the water-based ink of this embodiment is excellent in the handling performance.

Those usable as the self-dispersible pigment include, for example, those in which the self-dispersible pigment is treated or processed in accordance with any method described, for example, in Japanese Patent Application Laid-open No. 8-3498 corresponding to U.S. Pat. No. 5,609,671, Japanese Patent Application Laid-open No. 2000-513396 (PCT) corresponding to U.S. Pat. No. 5,837,045, Japanese Patent Application Laid-open No. 2009-515007 (PCT) corresponding to United States Patent Application Publication Nos. 2007/0100023 and 2007/0100024, and Japanese Patent Application Laid-open No. 2011-515535 (PCT) corresponding to United States Patent Application Publication No. 2009/0229489. For example, the pigment, which can be used as the raw material for the phosphate group-modified self-dispersible pigment referred to in the first embodiment, can be used as the pigment which can be used as the raw material for the self-dispersible pigment described above.

For example, any commercially available product may be used for the self-dispersible pigment. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M", and "CAB-O-JET (trade name) 470Y" produced by Cabot Corporation; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink SC Holdings Co., Ltd.

The solid content blending amount of the self-dispersible pigment (pigment solid content amount) with respect to the total amount of the water-based ink is not specifically limited, which can be appropriately determined, for example, on the basis of the desired optical density or the chromaticness. The pigment solid content amount is, for example, 0.1% by weight to 20% by weight, preferably 2% by weight to 10% by weight, and more preferably 4% by weight to 6% by weight.

It is preferable that the self-dispersible pigment includes self-dispersible C. I. Pigment Yellow 74 modified with phosphate group and self-dispersible C. I. Pigment Yellow 74 modified with sulfonic acid group. Accordingly, it is possible to obtain the water-based ink set in which the chromaticness is more improved.

It is preferable that the self-dispersible pigment includes at least one of self-dispersible C. I. Pigment Blue 15:4 modified with phosphate group and self-dispersible C. I. Pigment Blue 15:4 modified with sulfonic acid group. Accordingly, it is possible to obtain the water-based ink set in which the chromaticness is more improved.

It is preferable that the self-dispersible pigment includes self-dispersible C. I. Pigment Red 122 modified with sulfonic acid group. Accordingly, it is possible to obtain the water-based ink set in which the chromaticness is improved.

The colorant may further include, for example, other pigments and dyes in addition to the self-dispersible pigment. However, it is preferable that the colorant is composed of only the self-dispersible pigment, and the colorant does not contain any other colorant. When any other colorant is used in combination with the self-dispersible pigment, the content of the self-dispersible pigment with respect to the total amount of the colorant is, for example, 50% by weight to 100% by weight, preferably 80% by weight to 100% by weight, and more preferably 95% by weight to 100% by weight.

It is preferable that the water is ion exchange water or pure water. The blending amount of water (water ratio) with respect to the total amount of the water-based ink is, for example, 10% by weight to 90% by weight, and preferably 40% by weight to 80% by weight. The water ratio may be, for example, the balance of the other components.

It is preferable that the water-based ink further contains a water-soluble organic solvent. The water-soluble organic solvent is exemplified, for example, by a humectant which prevents the water-based ink from being dried at the nozzle forward end portion of the ink-jet head and a penetrant which adjusts the drying speed on the recording medium. As for the humectant and the penetrant, for example, those which are the same as or equivalent to those referred to in the first embodiment can be used in the same or equivalent blending amounts. The water-based ink may further contain conventionally known additives, if necessary.

In the case of the water-based ink set of this embodiment, when the water-based ink is applied to the recording medium prior to the treatment agent, it is preferable that the water-based ink does not contain the penetrant and the surfactant, or the water-based ink has a small blending amount thereof, and the permeability is low. Accordingly, the water-based ink is easily brought in contact with the treatment agent which is applied to the recording medium thereafter. It is possible to obtain the water-based ink set in which the optical density (OD value) and the chromaticness are more improved. The surface tension of the water-based ink is, for example, 20 mN/m to 50 mN/m, preferably 25 mN/m to 45 mN/m, and more preferably 30 mN/m to 40 mN/m.

The water-based ink described above can be prepared, for example, such that the colorant, water, and optionally other additive components are mixed uniformly or homogeneously in accordance with any conventionally known method, and undissolved matters are removed by a filter or the like.

Furthermore, when the water-based ink set is grasped as a combination of the water-based black ink, the water-based color inks, and the treatment agent, it is especially preferable to construct the water-based ink set in relation to the color inks such that at least one of self-dispersible C. I. Pigment Yellow 74 modified with phosphate group and self-dispersible C. I. Pigment Yellow 74 modified with sulfonic acid group is selected as the colorant for a water-based yellow ink, self-dispersible C. I. Pigment Red 122 modified with sulfonic acid group is selected as the colorant for a water-based magenta ink, and at least one of self-dispersible C. I. Pigment Blue 15:4 modified with phosphate group and self-dispersible C. I. Pigment Blue 15:4 modified with sulfonic acid group is selected as the colorant for a water-based cyan ink. However, it is possible to obtain the water-based ink set in which the image quality is improved as compared with the conventional technique, by merely using the self-dispersible pigment as the colorant of any one of the yellow, magenta, and cyan water-based inks.

Next, the treatment agent will be explained. The feature of the treatment agent is to contain at least one of pullulan and the derivative thereof. The other components are not specifically limited. Those which are the same as or equivalent to those of the first embodiment can be used as the pullulan or the like.

The blending amount of pullulan or the like with respect to the total amount of the treatment agent (ratio of pullulan or the like) is, for example, 0.1% by weight to 10% by weight, and preferably 0.1% by weight to 5% by weight in view of the discharge stability.

The mechanism for improving the optical density (OD value) and the chromaticness by using the water-based ink set of this embodiment is speculated to be the same as or equivalent to the mechanism for improving the optical density (OD value) and the chromaticness by using the water-based ink of the first embodiment described above. Furthermore, the blending of pullulan or the like, which is not directed to the water-based ink containing the self-dispersible pigment as described above but which is directed to the treatment agent, provides the following advantage. That is, if a large amount of pullulan or the like is blended to the water-based ink, then the aggregation is caused, and hence the blending amount of pullulan or the like is restricted. However, in the case of the treatment agent, the restriction as described above does not exist. Therefore, it is easy to obtain the effect to improve the optical density (OD value) and the chromaticness. For example, in the first embodiment in which pullulan or the like is blended to the water-based ink, the optical density and the chromaticness are improved for the water-based ink which contains the phosphate group-modified self-dispersible pigment as the colorant. On the other hand, in this embodiment (second embodiment) in which pullulan or the like is blended to the treatment agent, the optical density and the chromaticness are improved not only for the water-based ink which contains the phosphate group-modified self-dispersible pigment but also for the water-based ink which uses any self-dispersible pigment other than the above.

In the water-based ink set described above, it is preferable that the ratio of the blending amount (Y1:% by weight) of the pullulan or the like contained in the treatment agent with respect to the solid content amount (X1:% by weight) of the self-dispersible pigment contained in the water-based ink fulfills Y1/X1=0.025 to 2.5. When the ratio Y1/X1 is within this range, it is possible to obtain the water-based ink set which provides the higher optical density (OD value) and the higher chromaticness.

The treatment agent may further contain water. It is preferable that the water is ion exchange water or pure water. The blending amount of water with respect to the total amount of the treatment agent is not specifically limited. Furthermore, for example, it is also appropriate to adopt the following form. That is, water is contained as the balance of the other components, and the treatment agent can be used as a treatment solution capable of being discharged from an ink-jet head of an ink-jet recording apparatus.

The treatment agent may further contain a water-soluble organic solvent. Those having been hitherto known can be used as the water-soluble organic solvent. The water-soluble organic solvent is exemplified, for example, by polyhydric alcohol, polyhydric alcohol derivative, alcohol, amide, ketone, ketoalcohol (ketone alcohol), ether, nitrogen-containing solvent, sulfur-containing solvent, propylene carbonate, ethylene carbonate, and 1,3-dimethyl-2-imidazolidinone. The polyhydric alcohol is exemplified, for example, by glycerol, ethylene glycol, diethylene glycol, propylene glycol, butylene glycol, hexylene glycol, triethylene glycol, polyethylene glycol, dipropylene glycol, tripropylene glycol, polypropylene glycol, trimethylolpropane, 1,5-pentanediol, and 1,2,6-hexanetriol. The polyhydric alcohol derivative is exemplified, for example, by ethylene glycol methyl ether, ethylene glycol ethyl ether, ethylene glycol n-propyl ether, ethylene glycol n-butyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. The alcohol is exemplified, for example, by methyl alcohol, ethyl alcohol, n-propyl alcohol, isopropyl alcohol, n-butyl alcohol, sec-butyl alcohol, isobutyl alcohol, tert-butyl alcohol, and benzyl alcohol. The amide is exemplified, for example, by dimethylformamide and dimethylacetoamide. The ketone is exemplified, for example, by acetone. The ketoalcohol is exemplified, for example, by diacetone alcohol. The ether is exemplified, for example, by tetrahydrofuran and dioxane. The nitrogen-containing solvent is exemplified, for example, by pyrrolidone, 2-pyrrolidone, N-methyl-2-pyrrolidone, cyclohexylpyrrolidone, and triethanolamine. The sulfur-containing solvent is exemplified, for example, by thiodiethanol, thiodiglycol, thiodiglycerol, sulforan, and dimethylsulfoxide. The blending amount of the water-soluble organic solvent with respect to the total amount of the treatment agent is not specifically limited. One type of the water-soluble organic solvent may be used singly, or two or more types of the water-soluble organic solvents may be used in combination.

It is preferable that the treatment agent does not contain any colorant. However, it is also allowable that the treatment agent contains any colorant. When the treatment agent contains the colorant, it is preferable that the colorant is contained in an amount of such an extent that the recorded image is not affected thereby. When the treatment agent contains the colorant, the blending amount of the colorant in the treatment agent is, for example, preferably not more than 0.02% by weight, more preferably not more than 0.01% by weight, and much more preferably not more than 0.005% by weight.

The treatment agent may further contain a conventionally known additive, if necessary. The additive is exemplified, for example, by surfactant, pH-adjusting agent, viscosity-adjusting agent, surface tension-adjusting agent, antioxidizing agent, and fungicide. The viscosity-adjusting agent is exemplified, for example, by polyvinyl alcohol, cellulose, and water-soluble resin.

As for the water-based ink set of this embodiment, when the treatment agent is applied to the recording medium prior to the water-based ink, it is preferable that the treatment agent has the low permeability, while the treatment agent does not contain any surfactant and any solvent which is included in the water-soluble organic solvent and which enhances the permeability, or the treatment agent has a small blending amount thereof. Accordingly, the treatment agent is easily brought in contact with the water-based ink which is applied to the recording medium thereafter. It is possible to obtain the water-based ink set in which the optical density (OD value) and the chromaticness are more improved. The surface tension of the treatment agent is, for example, 20 mN/m to 60 mN/m, preferably 25 mN/m to 55 mN/m, and more preferably 30 mN/m to 50 mN/m.

The treatment agent described above can be prepared, for example, such that pullulan or the like and optionally other additive components are mixed uniformly or homogeneously in accordance with any conventionally known method.

The viscosity of the treatment agent explained above is not specifically limited. The viscosity can be appropriately adjusted depending on the method for applying the treatment agent to the recording medium. When the treatment agent is applied to the recording medium by an ink-jet head, the treatment agent can be a liquid having a viscosity capable of being discharged by the ink-jet head. When the treatment agent is applied to the recording medium by means of any mechanism other than the ink-jet head, for example, when the treatment agent is applied by means of the stamp application, the brush application, or the roller application, then it is also allowable to use a liquid in which the viscosity of the treatment agent is a high viscosity to such an extent that the ink-jet discharge cannot be performed, provided that the treatment agent can be applied to the recording medium. Alternatively, the treatment agent may be in a gel form.

The water-based ink set of this embodiment can be also provided as cartridges. For example, the cartridge of this embodiment may be provided as a cartridge set including a treatment agent cartridge which is provided with a treatment agent accommodating section for accommodating the treatment agent to construct the water-based ink set of this embodiment, and ink cartridges which are provided with ink cartridges for respective colors each having an ink accommodating section for accommodating the water-based ink to construct the water-based ink set of this embodiment. Alternatively, the cartridge of this embodiment may be an integrated type cartridge in which the interior is comparted to form a treatment agent accommodating section and ink accommodating sections, the treatment agent for constructing the water-based ink set of this embodiment is accommodated in the treatment agent accommodating section, and the water-based ink for constructing the water-based ink set of this embodiment is accommodated in the ink accommodating section. Any conventionally known main body can be used as the main body of the cartridge of this embodiment.

According to this embodiment, it is possible to provide the treatment agent which is usable for the water-based ink set and which has the feature to contain pullulan or the like. Furthermore, according to this embodiment, it is possible to provide the cartridge including the treatment agent.

Next, the recording method and the ink-jet recording apparatus of this embodiment will be explained.

The recording method of this embodiment resides in a recording method for performing recording by using a water-based ink set for ink-jet recording including a water-based ink for ink-jet recording and a treatment agent, the method including a treatment agent applying step of applying the treatment agent to the recording medium, and a discharge step of discharging the water-based ink in accordance with an ink-jet system onto the recording medium to which the treatment agent is applied in the treatment agent applying step, wherein the water-based ink set for ink-jet recording of this embodiment is used as the water-based ink set.

The ink-jet recording apparatus of this embodiment resides in an ink-jet recording apparatus including an ink set accommodating section, a treatment agent applying mechanism, and an ink discharge mechanism, wherein the water-based ink for ink-jet recording of this embodiment is accommodated in the ink set accommodating section, the treatment agent for constructing the water-based ink set is applied to a recording medium by the treatment agent applying mechanism, and the water-based ink for constructing the water-based ink set is discharged to the recording medium by the ink discharge mechanism.

The ink-jet recording method of this embodiment can be carried out, for example, by using the ink-jet recording apparatus of this embodiment. The recording includes, for example, the letter (character) printing, the image printing, and the printing (print or presswork).

Figure 2:
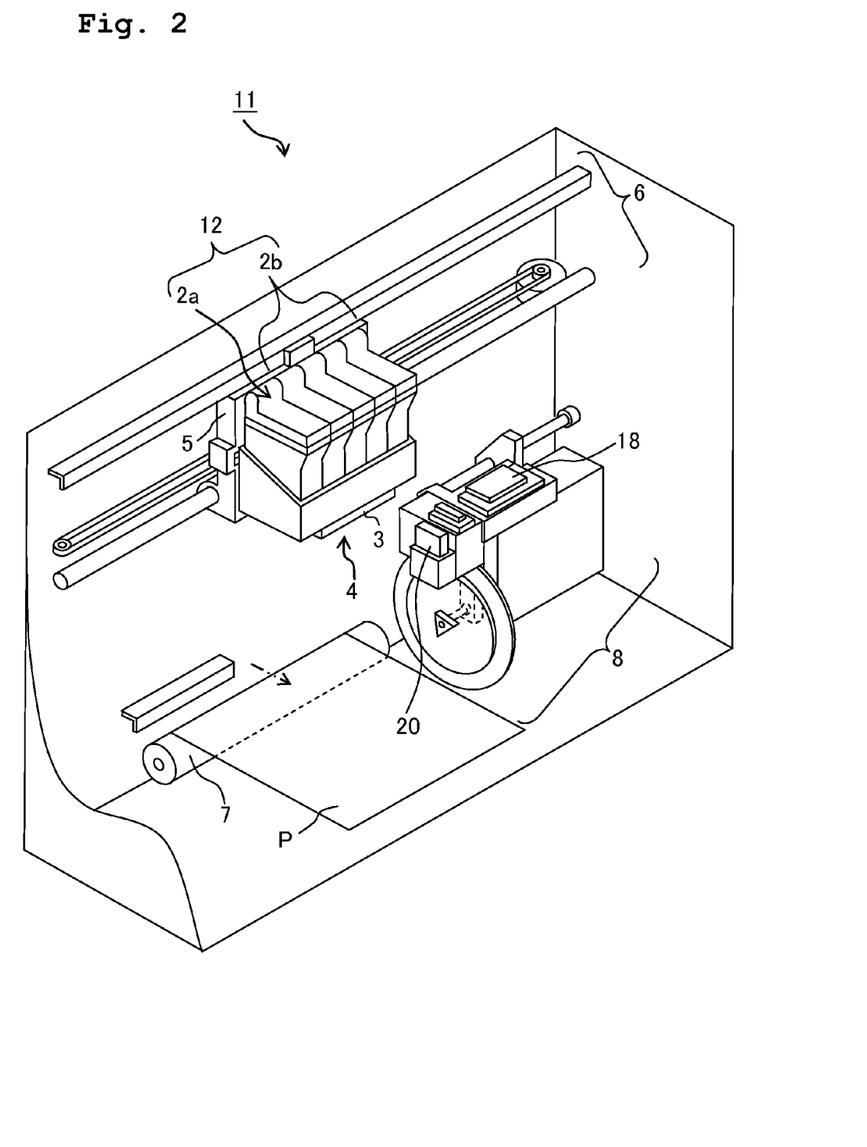
FIG. 2 shows a schematic perspective view illustrating an exemplary arrangement of an ink-jet recording apparatus according to a second embodiment.

FIG. 2 shows an exemplary construction of the ink-jet recording apparatus of this embodiment. The ink-jet recording apparatus of this example is a serial type ink-jet recording apparatus in which a serial type ink-jet head is adopted. As shown in FIG. 2, the serial type ink-jet recording apparatus 11 includes, as main constitutive components, a cartridge assembly 12, an ink discharge mechanism (serial type ink-jet head) 3, a head unit 4, a carriage 5, a driving unit 6, a platen roller 7, and a purge apparatus 8.

The cartridge assembly 12 includes a treatment agent cartridge 2a and four ink cartridges 2b. The treatment agent cartridge 2a contains the treatment agent of this embodiment. Each of the four ink cartridges 2b contains one color of each of four colors of water-based inks of yellow, magenta, cyan, and black. At least one of the four color water-based inks is the water-based ink of this embodiment.

The ink-jet recording apparatus 11 of this embodiment is constructed in the same manner as the ink-jet recording apparatus 1 of the first embodiment shown in FIG. 1 except that the cartridge assembly 12 is provided in place of the ink cartridges 2. The portions of the ink-jet recording apparatus 11 shown in FIG. 2, which are the same as or equivalent to those of the ink-jet recording apparatus 1 of the first embodiment shown in FIG. 1, are designated by the same reference numerals, any explanation of which will be omitted.

Figure 3A:
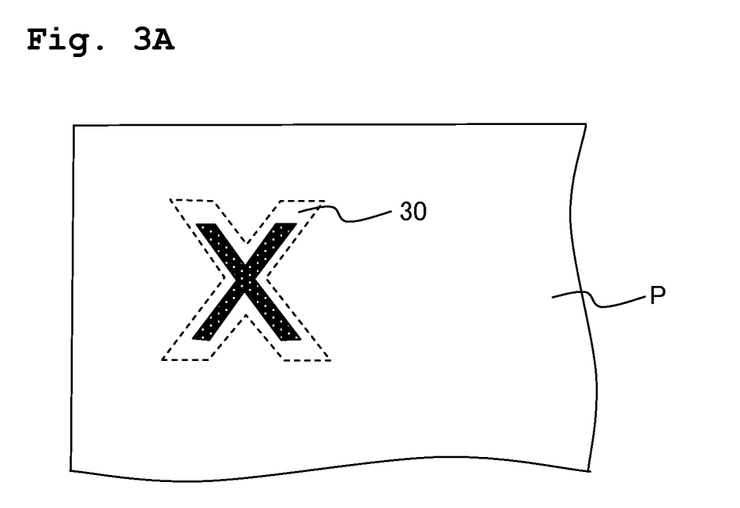
FIGS. 3A and 3B show examples of recording based on an ink-jet recording method according to the second embodiment.
Figure 3B:
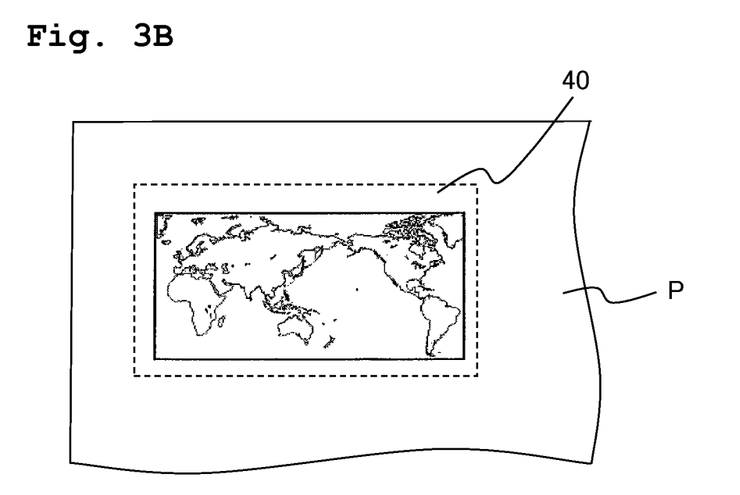

The recording, which is based on the use of the serial type ink-jet recording apparatus 1, is carried out, for example, as follows. At first, the treatment agent of this embodiment is applied (discharged) onto the recording paper P from the serial type ink-jet head 3. The treatment agent may be applied to either the entire surface of the recording surface of the recording paper P or a part thereof. When the treatment agent is applied to the part, at least the recording portion, which is subjected to the recording with the water-based ink on the recording surface of the recording paper P, is the application portion. When the treatment agent is applied to the part, it is preferable that the size of the application portion is larger than the recording portion. For example, as shown in FIG. 3A, when a letter (X) is recorded on the recording paper P, it is preferable to apply the treatment agent so that the application portion 30 is formed with a line width larger than the line width of the letter. Furthermore, as shown in FIG. 3B, when a pattern is recorded on the recording paper P, it is preferable to apply the treatment agent so that the application portion 40, which is larger than the pattern, is formed.

Subsequently, the water-based ink is discharged to the application portion of the treatment agent of the recording paper P from the serial type ink-jet head 3. Accordingly, the treatment agent and the water-based ink are brought in contact with each other on the recording paper P, and thus it is possible to obtain the recorded matter which is excellent in the optical density (OD value) and the chromaticness. The time, which ranges from the discharge of the treatment agent to the discharge of the water-based ink, is not specifically limited. For example, it is appropriate that the discharge of the water-based ink is carried out within the same scanning as that for the discharge of the treatment agent.

In this example, the treatment agent is used as the pretreatment agent which is applied to the recording paper P prior to the discharge of the water-based ink. However, this embodiment is not limited thereto. In this embodiment, the treatment agent may be applied after the water-based ink is discharged beforehand to the recording paper P, or the application of the treatment agent to the recording paper P and the discharge of the water-based ink may be performed simultaneously.

In the serial type ink-jet recording apparatus 11 of this embodiment, the ink discharge mechanism (serial type ink-jet head) 3 also serves as the treatment agent applying mechanism. However, this embodiment is not limited thereto. In this embodiment, the application of the treatment agent may be carried out in accordance with any system including, for example, the stamp application, the brush application, and the roller application.

The recording paper P, which is subjected to the recording as described above, is discharged from the serial type ink-jet recording apparatus 11. In FIG. 2, the paper feeding mechanism and the paper discharge mechanism for the recording paper P are omitted from the illustration.

In the apparatus shown in FIG. 2, the serial type ink-jet head is adopted. However, this embodiment is not limited thereto. The ink-jet recording apparatus may be an apparatus which adopts a line type ink-jet head.

In the water-based ink set for ink-jet recording of this embodiment, the treatment agent, which contains at least one of pullulan and the derivative thereof, is combined with the water-based ink containing the self-dispersible pigment. Accordingly, it is possible to further improve the optical density (OD value) and the chromaticness.

EXAMPLES

Next, Examples of the water-based ink of the present teaching will be explained together with Comparative Examples. The present teaching is not limited to and restricted by Examples and Comparative Examples described below.

Examples 1-1 to 1-9 and Comparative Examples 1-1 to 1-5

Ink solvents were obtained by uniformly mixing components except for the self-dispersible carbon black contained in black-based ink compositions (Table 1). Subsequently, the ink solvents were added to self-dispersible carbon black dispersed in water, followed by being uniformly mixed. After that, obtained mixtures were filtrated through a cellulose acetate type membrane filter produced by Toyo Roshi Kaisha, Ltd. (pore size: 3.00 μm), and thus water-based black-based inks for ink-jet recording of Examples 1-1 to 1-9 and Comparative Examples 1-1 to 1-5 were obtained.

In relation to the water-based black-based inks of Examples and Comparative Examples, (a) the evaluation of the optical density (OD value), (b) the evaluation of the storage stability, and (c) the overall evaluation were carried out in accordance with the following methods.

(a) Evaluation of Optical Density (OD Value)

An image including a black single color patch was recorded on regular paper at a resolution of 600 dpi×300 dpi with each of the water-based black-based inks of Examples and Comparative Examples by using an ink-jet printer DCP-J525N produced by Brother Industries, Ltd, and evaluation samples were prepared. Optical densities (OD values) were measured at five positions in the evaluation sample by using a spectrophotometer (spectrophotometric colorimetry meter) SpectroEye produced by X-Rite, and an average value was determined. The evaluation was performed in accordance with the following evaluation criteria. Recycled Supreme produced by XEROX was used for the regular paper.

<Evaluation Criteria for Evaluation of Optical Density (OD Value)>

A: The optical density (OD value) was not less than 1.19 times the optical density (OD value) of Comparative Example which was included in Comparative Examples 1-3 to 1-5 and which was under the same condition except that pullulan was not blended.

B: The optical density (OD value) was above 1.15 times and less than 1.19 times the optical density (OD value) of Comparative Example which was included in Comparative Examples 1-3 to 1-5 and which was under the same condition except that pullulan was not blended.

C: The optical density (OD value) was not more than 1.15 times the optical density (OD value) of Comparative Example which was included in Comparative Examples 1-3 to 1-5 and which was under the same condition except that pullulan was not blended.

(b) Evaluation of Storage Stability

The water-based black-based inks of Examples and Comparative Examples were introduced into hermetically sealed containers, followed by being stored for 1 day in an environment of temperature of 40° C. Observation was performed with a microscope (magnification: ×200) to investigate whether or not any aggregate is absent in the evaluation sample prepared as described above. The storage stability was evaluated in accordance with the following evaluation criteria.

<Evaluation Criteria for Evaluation of Storage Stability>

A: Any aggregate was absent.
B: A trace amount of aggregate was observed.
C: A large amount of aggregate was observed.

(c) Overall Evaluation

The overall evaluation was performed in accordance with the following evaluation criteria from the results of (a) and (b) described above for each of the water-based black-based inks.

<Evaluation Criteria for Overall Evaluation>

G: All of the evaluation results of (a) and (b) were not C.
NG: Any one of or both of the evaluation results of (a) and (b) was/were C.

Table 1 shows the black-based ink compositions and the evaluation results of the water-based black-based inks of Examples and Comparative Examples.

TABLE 1

| | | Example | | | | |
|---|---|---|---|---|---|---|
| | | 1-1 | 1-2 | 1-3 | 1-4 | 1-5 |
| Black-based ink composition (% by weight) | (X) Self-dispersible carbon black modified with phosphate group (*1) | 7.0 | 7.0 | 7.0 | 7.0 | 7.0 |
| | CAB-O-JET (trade name) 200 (*2) | — | — | — | — | — |
| | Glycerol | 33.0 | 33.0 | 31.0 | 31.0 | 32.0 |
| | Triethylene glycol | — | — | 2.0 | — | — |
| | 1,2-Hexanediol | — | — | — | 2.0 | — |
| | Triethylene glycol n-butyl ether | — | — | — | — | 0.5 |
| | (Y) Pullulan | 2.00 | 1.00 | 1.00 | 1.00 | 1.00 |
| | Starch | — | — | — | — | — |
| | Olfine (trade name) E1010 (*3) | 0.25 | 0.25 | 0.25 | 0.25 | 0.25 |
| | Water | balance | balance | balance | balance | balance |
| Y/X | | 0.29 | 0.14 | 0.14 | 0.14 | 0.14 |
| Optical density (OD value) | | 1.40 | 1.39 | 1.38 | 1.38 | 1.37 |
| Relative ratio (if Comp. Ex. 1-3 is assumed as 1) | | 1.22 | 1.21 | 1.20 | 1.20 | 1.19 |
| Relative ratio (if Comp. Ex. 1-4 is assumed as 1) | | — | — | — | — | — |
| Relative ratio (if Comp. Ex. 1-5 is assumed as 1) | | — | — | — | — | — |
| Evaluation of optical density | | A | A | A | A | A |
| Evaluation of storage stability | | A | A | A | A | A |
| Overall evaluation | | G | G | G | G | G |

| | | Example | | | |
|---|---|---|---|---|---|
| | | 1-6 | 1-7 | 1-8 | 1-9 |
| Black-based ink composition (% by weight) | (X) Self-dispersible carbon black modified with phosphate group (*1) | 7.0 | 7.0 | 4.0 | 4.0 |
| | CAB-O-JET (trade name) 200 (*2) | — | — | — | — |
| | Glycerol | 33.0 | 33.0 | 33.0 | 33.0 |
| | Triethylene glycol | — | — | — | — |

TABLE 1-continued

|  |  |  |  |  |  |
|---|---|---|---|---|---|
| | 1,2-Hexanediol | — | — | — | — |
| | Triethylene glycol n-butyl ether | — | — | — | — |
| | (Y) Pullulan | 0.50 | 0.80 | 5.00 | 8.00 |
| | Starch | — | — | — | — |
| | Olfine (trade name) E1010 (*3) | 0.25 | 0.25 | 0.25 | 0.25 |
| | Water | balance | balance | balance | balance |
| Y/X | | 0.07 | 0.11 | 1.25 | 2.00 |
| Optical density (OD value) | | 1.35 | 1.38 | 1.27 | 1.26 |
| Relative ratio (if Comp. Ex. 1-3 is assumed as 1) | | 1.17 | 1.20 | — | — |
| Relative ratio (if Comp. Ex. 1-4 is assumed as 1) | | — | — | — | — |
| Relative ratio (if Comp. Ex. 1-5 is assumed as 1) | | — | — | 1.20 | 1.19 |
| Evaluation of optical density | | B | A | A | A |
| Evaluation of storage stability | | A | A | A | B |
| Overall evaluation | | G | G | G | G |

| | | Comparative Example | | | | |
|---|---|---|---|---|---|---|
| | | 1-1 | 1-2 | 1-3 | 1-4 | 1-5 |
| Black-based ink composition (% by weight) | (X) Self-dispersible carbon black modified with phosphate group (*1) | — | 7.0 | 7.0 | — | 4.0 |
| | CAB-O-JET (trade name) 200 (*2) | 35.00 (7.0) | — | — | 35.00 (7.0) | — |
| | Glycerol | 33.0 | 33.0 | 33.0 | 33.0 | 33.0 |
| | Triethylene glycol | — | — | — | — | — |
| | 1,2-Hexanediol | — | — | — | — | — |
| | Triethylene glycol n-butyl ether | — | — | — | — | — |
| | (Y) Pullulan | 1.00 | — | — | — | — |
| | Starch | — | 1.00 | — | — | — |
| | Olfine (trade name) E1010 (*3) | 0.25 | 0.25 | 0.25 | 0.25 | 0.25 |
| | Water | balance | balance | balance | balance | balance |
| Y/X | | 0.14 | — | — | — | — |
| Optical density (OD value) | | 1.25 | 1.24 | 1.15 | 1.10 | 1.06 |
| Relative ratio (if Comp. Ex. 1-3 is assumed as 1) | | — | 1.08 | — | — | — |
| Relative ratio (if Comp. Ex. 1-4 is assumed as 1) | | 1.14 | — | — | — | — |
| Relative ratio (if Comp. Ex. 1-5 is assumed as 1) | | — | — | — | — | — |
| Evaluation of optical density | | C | C | — | — | — |
| Evaluation of storage stability | | A | A | — | — | — |
| Overall evaluation | | NG | NG | — | — | — |

LEGEND
(*1): Prepared by method described, for example, in US2009/0229489
(*2): Self-dispersible carbon black modified with sulfonic acid group; produced by Cabot Corporation; carbon black concentration = 20% by weight; parenthesized numeral indicates pigment solid content amount
(*3): Acetylene glycol-based surfactant (ethylene oxide (10 mol) adduct of diol); produced by Nissin Chemical Industry Co., Ltd.; active ingredient = 100%.

As shown in Table 1, in Examples 1-1 to 1-7, the optical density (OD value) was improved, which was not less than 1.17 times that of Comparative Example 1-3 having the same condition except that pullulan was not blended. Also in Examples 1-8 and 1-9, the optical density (OD value) was improved to be 1.20 times and 1.19 times that of Comparative Example 1-5 having the same condition except that pullulan was not blended. In particular, in Examples 1-1 to 1-5, 1-7, and 1-8 in which the weight ratio (X:Y) between the phosphate group-modified self-dispersible black-based pigment (X) and pullulan (Y) was 1:0.11 to 1.25 (Y/X was 0.11 to 1.25) and the blending amount of pullulan (Y) was 0.8% by weight to 5% by weight, the optical density (OD value) was greatly improved to be not less than 1.19 times that of Comparative Example having the same condition except that pullulan was not blended, and the storage stability was more excellent as well. On the other hand, in Comparative Example 1-1 in which a self-dispersible black-based pigment modified with sulfonic acid group was used in place of the phosphate group-modified self-dispersible black-based pigment, the optical density (OD value) remained 1.14 times that of Comparative Example 1-4 having the same condition except that pullulan was not blended. Furthermore, in Comparative Example 1-2 in which starch was used in place of pullulan, the optical density (OD value) remained 1.08 times that of Comparative Example 1-3 having the same condition except that starch was not used.

As described above, the water-based ink of the present teaching makes it possible to further improve the optical density (OD value) and the chromaticness. The way of use of the water-based ink of the present teaching is not specifically limited, which can be widely applicable to various types of ink-jet recording.

Next, Examples of the water-based ink set of the present teaching will be explained together with Comparative Examples. The present teaching is not limited to and restricted by Examples and Comparative Examples described below.

<Preparation of Water-Based Ink>

Ink solvents were obtained by uniformly mixing components except for the water dispersion of the self-dispersible pigment contained in water-based ink compositions (Table 2). Subsequently, the ink solvents were added to the water dispersion of the self-dispersible pigment, followed by being uniformly mixed. After that, obtained mixtures were filtrated through a cellulose acetate type membrane filter produced by Toyo Roshi Kaisha, Ltd. (pore size: 3.00 μm), and thus water-based yellow inks for ink-jet recording A and B, water-based cyan inks for ink-jet recording C and D, and a water-based magenta ink for ink-jet recording E were obtained.

<Preparation of Treatment Agent>

Respective components of treatment agent compositions (Table 3) were uniformly mixed, and treatment agents 1 to 4 were obtained. The molecular weight of pullulan used for the treatment agents 1 to 3 was 50,000 to 100,000.

TABLE 2

| | | Water-based ink | | | | |
|---|---|---|---|---|---|---|
| | | A | B | C | D | E |
| (X1) | Water dispersion of self-dispersible C. I. Pigment Yellow 74 modified with phosphate group (*1) | 26.67 (4) | — | — | — | — |
| | CAB-O-JET (trade name) 270Y (*2) | — | 40.00 (4) | — | — | — |
| | Water dispersion of self-dispersible C. I. Pigment Blue 15:4 modified with phosphate group (*3) | — | — | 26.67 (4) | — | — |
| | CAB-O-JET (trade name) 250C (*4) | — | — | — | 40.00 (4) | — |
| | CAB-O-JET (trade name) 260M (*5) | — | — | — | — | 40.00 (4) |
| Glycerol | | 20.0 | 20.0 | 20.0 | 20.0 | 20.0 |
| Triethylene glycol n-butyl ether | | 2.0 | 2.0 | 2.0 | 2.0 | 2.0 |
| Olfine (trade name) E1010 (*6) | | 0.2 | 0.2 | 0.2 | 0.2 | 0.2 |
| Water | | balance | balance | balance | balance | balance |

LEGEND
(*1): Prepared by method described, for example, in US2009/0229489; C. I. Pigment Yellow 74 concentration = 15% by weight; parenthesized numeral indicates pigment solid content amount
(*2): Water dispersion of self-dispersible C. I. Pigment Yellow 74 modified with sulfonic acid group; produced by Cabot Corporation; C. I. Pigment Yellow 74 concentration = 10% by weight; parenthesized numeral indicates pigment solid content amount
(*3): Prepared by method described, for example, in US2009/0229489; C. I. Pigment Blue 15:4 concentration = 15% by weight; parenthesized numeral indicates pigment solid content amount
(*4): Water dispersion of self-dispersible C. I. Pigment Blue 15:4 modified with sulfonic acid group; produced by Cabot Corporation; C. I. Pigment Blue 15:4 concentration = 10% by weight; parenthesized numeral indicates pigment solid content amount
(*5): Water dispersion of self-dispersible C. I. Pigment Red 122 modified with sulfonic acid group; produced by Cabot Corporation; C. I. Pigment Red 122 concentration = 10% by weight; parenthesized numeral indicates pigment solid content amount
(*6): Acetylene glycol-based surfactant (ethylene oxide (10 mol) adduct of diol); produced by Nissin Chemical Industry Co., Ltd.; active ingredient = 100%

TABLE 3

| | Treatment agent (% by weight) | | | |
|---|---|---|---|---|
| | 1 | 2 | 3 | 4 |
| Pullulan (Y1) | 0.1 | 5 | 10 | — |
| Starch | — | — | — | — |
| Water | balance | balance | balance | balance |

TABLE 4

| | Water-based yellow ink | Treatment agent | Y1/X1 | Chromaticness (C*) | ΔC* |
|---|---|---|---|---|---|
| Ex. 2-1 | A | 1 | 0.025 | 83.7 | 7.7 |
| Ex. 2-2 | A | 2 | 1.25 | 82.2 | 6.2 |
| Ex. 2-3 | A | 3 | 2.5 | 80.3 | 4.3 |
| Comp. Ex. 2-1 | A | 4 | — | 74.2 | −1.8 |
| Comp. Ex. 2-2 | A | — | — | 76.0 | — |

Examples 2-1 to 2-3 and Comparative Example 2-1

Water-based ink sets for ink-jet recording were obtained by combining the water-based yellow ink A and the treatment agents 1 to 4 as shown in Table 4.

The evaluation of the chromaticness (C*) difference (ΔC*) was carried out in accordance with the following method in relation to Examples 2-1 to 2-3 and Comparative Example 2-1.

An image including a yellow single color patch was recorded on regular paper at a resolution of 600 dpi×300 dpi by continuously discharging the treatment agent and the water-based ink for constructing each of water-based ink sets of Examples 2-1 to 2-3 and Comparative Example 2-1 by using an ink-jet printer DCP-J525N produced by Brother Industries, Ltd., and evaluation samples were prepared. Chromaticnesses (C*) were measured at five positions in the evaluation sample by using a spectrophotometer (spectrophotometric colorimetry meter) SpectroEye produced by X-Rite, and an average value was determined. Recycled Supreme produced by XEROX was used for the regular paper.

Subsequently, the chromaticness (C*) difference (ΔC*) was calculated by subtracting the chromaticness (C*) of Comparative Example 2-2 in which the evaluation sample was prepared by using only the water-based yellow ink A without using the treatment agent, from the chromaticness (C*) of each of Examples 2-1 to 2-3 and Comparative Example 2-1.

Table 4 shows the water-based yellow ink and the treatment agents for constructing the water-based ink sets of Examples 2-1 to 2-3 and Comparative Example 2-1 and the evaluation results of the chromaticness (C*) difference (ΔC*).

As shown in Table 4, the improvement in the chromaticness (C*) was observed in Examples 2-1 to 2-3 as compared with Comparative Example 2-2 in which the evaluation sample was prepared by using only the water-based yellow ink A without using the treatment agent. On the other hand, the chromaticness (C*) was lowered in Comparative Example 2-1 in which the aqueous starch solution was used as the treatment agent, as compared with Comparative Example 2-2.

Examples 3-1 to 3-3 and Comparative Example 3-1

Water-based ink sets for ink-jet recording were obtained by combining the water-based yellow ink B and the treatment agents 1 to 4 as shown in Table 5.

The evaluation of the chromaticness (C*) difference (ΔC*) was carried out in relation to Examples 3-1 to 3-3 and Comparative Example 3-1 in the same manner as Examples 2-1 to 2-3 and Comparative Example 2-1.

Table 5 shows the water-based yellow ink and the treatment agents for constructing the water-based ink sets of Examples 3-1 to 3-3 and Comparative Example 3-1 and the evaluation results of the chromaticness (C*) difference (ΔC*).

TABLE 5

| | Water-based yellow ink | Treatment agent | Y1/X1 | Chromaticness (C*) | ΔC* |
|---|---|---|---|---|---|
| Ex. 3-1 | B | 1 | 0.025 | 82.5 | 5.8 |
| Ex. 3-2 | B | 2 | 1.25 | 82.0 | 5.3 |
| Ex. 3-3 | B | 3 | 2.5 | 81.2 | 4.5 |

TABLE 5-continued

| | Water-based yellow ink | Treatment agent | Y1/X1 | Chromaticness (C*) | ΔC* |
|---|---|---|---|---|---|
| Comp. Ex. 3-1 | B | 4 | — | 73.6 | −3.0 |
| Comp. Ex. 3-2 | B | — | — | 76.7 | — |

As shown in Table 5, the improvement in the chromaticness (C*) was observed in Examples 3-1 to 3-3 as compared with Comparative Example 3-2 in which the evaluation sample was prepared by using only the water-based yellow ink B without using the treatment agent. On the other hand, the chromaticness (C*) was lowered in Comparative Example 3-1 in which the aqueous starch solution was used as the treatment agent, as compared with Comparative Example 3-2.

Example 4-1 and Comparative Example 4-1

Water-based ink sets for ink-jet recording were obtained by combining the water-based cyan ink C and the treatment agent 3 or 4 as shown in Table 6.

The evaluation of the chromaticness (C*) difference (ΔC*) was carried out in relation to Example 4-1 and Comparative Example 4-1 in the same manner as Examples 2-1 to 2-3 and Comparative Example 2-1.

Table 6 shows the water-based cyan ink and the treatment agents for constructing the water-based ink sets of Example 4-1 and Comparative Example 4-1 and the evaluation results of the chromaticness (C*) difference (ΔC*).

TABLE 6

| | Water-based cyan ink | Treatment agent | Y1/X1 | Chromaticness (C*) | ΔC* |
|---|---|---|---|---|---|
| Ex. 4-1 | C | 3 | 2.5 | 55.5 | 3.0 |
| Comp. Ex. 4-1 | C | 4 | — | 50.7 | −1.8 |
| Comp. Ex. 4-2 | C | — | — | 52.5 | — |

As shown in Table 6, the improvement in the chromaticness (C*) was observed in Example 4-1 as compared with Comparative Example 4-2 in which the evaluation sample was prepared by using only the water-based cyan ink C without using the treatment agent. On the other hand, the chromaticness (C*) was lowered in Comparative Example 4-1 in which the aqueous starch solution was used as the treatment agent, as compared with Comparative Example 4-2.

Example 5-1 and Comparative Example 5-1

Water-based ink sets for ink-jet recording were obtained by combining the water-based cyan ink D and the treatment agent 3 or 4 as shown in Table 7.

The evaluation of the chromaticness (C*) difference (ΔC*) was carried out in relation to Example 5-1 and Comparative Example 5-1 in the same manner as Examples 2-1 to 2-3 and Comparative Example 2-1.

Table 7 shows the water-based cyan ink and the treatment agents for constructing the water-based ink sets of Example 5-1 and Comparative Example 5-1 and the evaluation results of the chromaticness (C*) difference (ΔC*).

TABLE 7

| | Water-based cyan ink | Treatment agent | Y1/X1 | Chromaticness (C*) | ΔC* |
|---|---|---|---|---|---|
| Ex. 5-1 | D | 3 | 2.5 | 54.0 | 4.9 |
| Comp. Ex. 5-1 | D | 4 | — | 48.0 | −1.1 |
| Comp. Ex. 5-2 | D | — | — | 49.1 | — |

As shown in Table 7, the improvement in the chromaticness (C*) was observed in Example 5-1 as compared with Comparative Example 5-2 in which the evaluation sample was prepared by using only the water-based cyan ink D without using the treatment agent. On the other hand, the chromaticness (C*) was lowered in Comparative Example 5-1 in which the aqueous starch solution was used as the treatment agent, as compared with Comparative Example 5-2.

Example 6-1 and Comparative Example 6-1

Water-based ink sets for ink-jet recording were obtained by combining the water-based magenta ink E and the treatment agent 3 or 4 as shown in Table 8.

The evaluation of the chromaticness (C*) difference (ΔC*) was carried out in relation to Example 6-1 and Comparative Example 6-1 in the same manner as Examples 2-1 to 2-3 and Comparative Example 2-1.

Table 8 shows the water-based magenta ink and the treatment agents for constructing the water-based ink sets of Example 6-1 and Comparative Example 6-1 and the evaluation results of the chromaticness (C*) difference (ΔC*).

TABLE 8

| | Water-based magenta ink | Treatment agent | Y1/X1 | Chromaticness (C*) | ΔC* |
|---|---|---|---|---|---|
| Ex. 6-1 | E | 3 | 2.5 | 59.5 | 2.7 |
| Comp. Ex. 6-1 | E | 4 | — | 53.0 | −3.8 |
| Comp. Ex. 6-2 | E | — | — | 56.8 | — |

As shown in Table 8, the improvement in the chromaticness (C*) was observed in Example 6-1 as compared with Comparative Example 6-2 in which the evaluation sample was prepared by using only the water-based magenta ink E without using the treatment agent. On the other hand, the chromaticness (C*) was lowered in Comparative Example 6-1 in which the aqueous starch solution was used as the treatment agent, as compared with Comparative Example 6-2.

In the ink sets of Examples 2-1 to 2-3, 3-1 to 3-3, 4-1, 5-1, and 6-1 explained above, the ratio (Y1/X1) of the blending amount (Y1:% by weight) of pullulan or the like contained in the treatment agent with respect to the solid content amount (X1:% by weight) of the self-dispersible pigment contained in the water-based ink was within a range to fulfill Y1/X1=0.025 to 2.5, and the improvement in the chromaticness was observed.

As described above, the water-based ink set of the present teaching makes it possible to further improve the optical density (OD value) and the chromaticness. The way of use of the water-based ink set of the present teaching is not specifically limited, which can be widely applicable to various types of ink-jet recording.

What is claimed is:

1. A water-based ink for ink-jet recording, comprising:
   a self-dispersible pigment modified with phosphate group;
   pullulan or a derivative thereof; and
   water.

2. The water-based ink for ink-jet recording according to claim 1, wherein the self-dispersible pigment modified with the phosphate group is a self-dispersible black-based pigment modified with phosphate group.

3. The water-based ink for ink-jet recording according to claim 1, wherein the self-dispersible pigment modified with the phosphate group is a self-dispersible carbon black modified with phosphate group.

4. The water-based ink for ink-jet recording according to claim 1, wherein the self-dispersible pigment modified with the phosphate group is a self-dispersible chromatic color pigment modified with phosphate group.

5. The water-based ink for ink-jet recording according to claim 1, wherein the water-based ink contains the pullulan.

6. The water-based ink for ink-jet recording according to claim 1, wherein a molecular weight of the pullulan or the derivative thereof is 10,000 to 40,000.

7. The water-based ink for ink-jet recording according to claim 1, wherein a weight ratio (Y/X) of a weight (Y) of the pullulan or the derivative thereof to a weight (X) of the self-dispersible pigment modified with the phosphate group fulfills 0.11 to 1.25.

8. The water-based ink for ink-jet recording according to claim 1, wherein the pullulan or the derivative thereof is contained by 0.8% by weight to 5% by weight in the water-based ink.

9. The water-based ink for ink-jet recording according to claim 1, wherein:
   a weight ratio (Y/X) of a weight (Y) of the pullulan or the derivative thereof to a weight (X) of the self-dispersible pigment modified with the phosphate group fulfills 0.11 to 1.25; and
   the pullulan or the derivative thereof is contained by 0.8% by weight to 5% by weight in the water-based ink.

10. A water-based ink set for ink-jet recording, comprising:
    a water-based ink for ink-jet recording which contains a self-dispersible pigment and water; and
    a treatment agent which contains pullulan or a derivative thereof.

11. The water-based ink set for ink-jet recording according to claim 10, wherein the self-dispersible pigment is self-dispersible C. I. Pigment Yellow 74 modified with phosphate group or self-dispersible C. I. Pigment Yellow 74 modified with sulfonic acid group.

12. The water-based ink set for ink-jet recording according to claim 10, wherein the self-dispersible pigment is self-dispersible C. I. Pigment Blue 15:4 modified with phosphate group or self-dispersible C. I. Pigment Blue 15:4 modified with sulfonic acid group.

13. The water-based ink set for ink-jet recording according to claim 10, wherein the self-dispersible pigment is self-dispersible C. I. Pigment Red 122 modified with sulfonic acid group.

14. The water-based ink set for ink-jet recording according to claim 10, wherein a plurality of the water-based inks for ink-jet recording are:
    a water-based yellow ink which contains self-dispersible C. I. Pigment Yellow 74 modified with phosphate group or self-dispersible C. I. Pigment Yellow 74 modified with sulfonic acid group;
    a water-based magenta ink which contains self-dispersible C. I. Pigment Red 122 modified with sulfonic acid group; and
    a water-based cyan ink which contains self-dispersible C. I. Pigment Blue 15:4 modified with phosphate group or self-dispersible C. I. Pigment Blue 15:4 modified with sulfonic acid group.

15. The water-based ink set for ink-jet recording according to claim 10, wherein the treatment agent contains the pullulan.

16. The water-based ink set for ink-jet recording according to claim 10, wherein a molecular weight of the pullulan or the derivative thereof is 10,000 to 40,000.

17. The water-based ink set for ink-jet recording according to claim 10, wherein a ratio (Y1/X1) of a blending amount (Y1:% by weight) of the pullulan or the derivative thereof contained in the treatment agent to a solid content amount (X1:% by weight) of the self-dispersible pigment contained in the water-based ink fulfills 0.025 to 2.5.

18. The water-based ink set for ink-jet recording according to claim 10, wherein the pullulan or the derivative thereof is contained by 0.1% by weight to 10% by weight in the treatment agent.

19. The water-based ink set for ink-jet recording according to claim 10, wherein:
    a ratio (Y1/X1) of a blending amount (Y1:% by weight) of the pullulan or the derivative thereof contained in the treatment agent to a solid content amount (X1:% by weight) of the self-dispersible pigment contained in the water-based ink fulfills 0.025 to 2.5; and
    the pullulan or the derivative thereof is contained by 0.1% by weight to 10% by weight in the treatment agent.

20. A treatment agent which is to be used for the water-based ink set for ink-jet recording as defined in claim 10.

* * * * *